(12) United States Patent
Nagasawa et al.

(10) Patent No.: US 8,170,744 B2
(45) Date of Patent: May 1, 2012

(54) FRONT ELECTRONIC EQUIPMENT SYSTEM WITH A LIN-SUBBUS

(75) Inventors: Kazumi Nagasawa, Toyota (JP); Toshiaki Ozaki, Toyota (JP); Norihito Shimizu, Toyota (JP)

(73) Assignee: Yazaki Corporation, Tokyo (JP)

( * ) Notice: Subject to any disclaimer, the term of this patent is extended or adjusted under 35 U.S.C. 154(b) by 966 days.

(21) Appl. No.: 10/552,453

(22) PCT Filed: Apr. 6, 2004

(86) PCT No.: PCT/JP2004/004944
§ 371 (c)(1),
(2), (4) Date: Oct. 7, 2005

(87) PCT Pub. No.: WO2004/089697
PCT Pub. Date: Oct. 21, 2004

(65) Prior Publication Data
US 2006/0274467 A1  Dec. 7, 2006

(30) Foreign Application Priority Data
Apr. 9, 2003  (JP) ................................. 2003-105206

(51) Int. Cl.
*G05B 15/00* (2006.01)
(52) U.S. Cl. ............ 701/36; 701/29; 370/351; 370/389; 709/230; 709/232; 709/235; 709/245; 307/9.1; 700/1; 700/2; 700/3; 700/9
(58) Field of Classification Search .................. None
See application file for complete search history.

(56) References Cited

U.S. PATENT DOCUMENTS

| 4,156,151 | A | | 5/1979 | Borroni |
| 5,251,211 | A | * | 10/1993 | Mutoh et al. .................. 370/445 |
| 5,508,689 | A | * | 4/1996 | Rado et al. ..................... 340/3.1 |
| 5,533,029 | A | * | 7/1996 | Gardner ........................ 370/329 |
| 5,592,485 | A | * | 1/1997 | Consiglieri et al. ........... 340/2.1 |

(Continued)

FOREIGN PATENT DOCUMENTS
DE    197 39 410 C1    12/1998
(Continued)

OTHER PUBLICATIONS

J. Will Specks, et al., "LIN—Protocol, Development Tools, and Software Interfaces for Local Interconnect Networks in Vehicles", 9th International Conference on Electronic Systems for Vehicles, Baden-Baden Oct. 5/6, 2000, pp. 1-24.

(Continued)

*Primary Examiner* — Jonathan M Dager
(74) *Attorney, Agent, or Firm* — Sughrue Mion, PLLC

(57) ABSTRACT

A front electronic equipment system includes a load electrical parts provided at a front portion of a vehicle, a front electrical control unit which receives a control signal for controlling the drive of the load electrical parts through a main bus line of the vehicle, and a drive control unit connected to the front electrical control unit through a sub bus line, converting the control signal into a drive signal, and driving the load electrical parts based on the drive signal. The front electrical control unit converts a communication protocol of the control signal from a communication protocol of the main bus line into a communication protocol of the sub bus line, and transmits the converted control signal received through the main bus line to the drive control unit through the sub bus line.

11 Claims, 9 Drawing Sheets

U.S. PATENT DOCUMENTS

| | | | | |
|---|---|---|---|---|
| 5,670,845 A | * | 9/1997 | Grant et al. | 315/77 |
| 5,675,189 A | * | 10/1997 | Anma et al. | 307/9.1 |
| 5,726,638 A | * | 3/1998 | Kobayashi | 375/232 |
| 5,859,845 A | * | 1/1999 | Oniishi et al. | 370/386 |
| 5,943,315 A | * | 8/1999 | Iwasawa et al. | 370/216 |
| 5,978,352 A | * | 11/1999 | Imaizumi et al. | 370/216 |
| 5,990,573 A | * | 11/1999 | Granitz et al. | 307/10.1 |
| 6,067,302 A | * | 5/2000 | Tozuka | 370/464 |
| 6,157,089 A | * | 12/2000 | Xu | 307/9.1 |
| 6,167,061 A | * | 12/2000 | Nakatsugawa | 370/480 |
| 6,272,135 B1 | * | 8/2001 | Nakatsugawa | 370/390 |
| 6,273,771 B1 | * | 8/2001 | Buckley et al. | 440/84 |
| 6,301,508 B1 | * | 10/2001 | Matsuura | 700/3 |
| 6,321,148 B1 | * | 11/2001 | Leung | 701/29 |
| 6,338,010 B1 | * | 1/2002 | Sparks et al. | 701/1 |
| 6,359,554 B1 | * | 3/2002 | Skibinski et al. | 340/438 |
| 6,420,797 B1 | * | 7/2002 | Steele et al. | 307/9.1 |
| 6,485,155 B1 | | 11/2002 | Duroux et al. | |
| 6,522,935 B1 | * | 2/2003 | Imaizumi et al. | 700/12 |
| 6,665,310 B1 | * | 12/2003 | Nakatsugawa | 370/442 |
| 6,700,795 B1 | * | 3/2004 | Jones et al. | 361/784 |
| 6,747,982 B2 | * | 6/2004 | Nakatsugawa | 370/403 |
| 6,900,555 B2 | * | 5/2005 | Sakamoto et al. | 307/10.1 |
| 6,902,433 B1 | | 6/2005 | Hashimoto et al. | 439/620.15 |
| 6,994,562 B2 | * | 2/2006 | Suzuki et al. | 439/61 |
| 7,102,496 B1 | * | 9/2006 | Ernst et al. | 340/436 |
| 7,253,566 B2 | * | 8/2007 | Lys et al. | 315/291 |
| 7,260,437 B2 | * | 8/2007 | Senoo et al. | 700/9 |
| 7,275,027 B2 | * | 9/2007 | Sproule et al. | 703/22 |
| 7,543,097 B2 | * | 6/2009 | Sakane | 710/300 |
| 7,546,407 B2 | * | 6/2009 | Sakane | 710/300 |
| 7,583,181 B2 | * | 9/2009 | Enders et al. | 340/12.36 |
| 7,598,684 B2 | * | 10/2009 | Lys et al. | 315/307 |
| 7,904,569 B1 | * | 3/2011 | Gelvin et al. | 709/229 |
| 2002/0003781 A1 | * | 1/2002 | Kikkawa et al. | 370/254 |
| 2002/0060625 A1 | * | 5/2002 | Lesesky et al. | 340/431 |
| 2002/0065594 A1 | | 5/2002 | Squires et al. | |
| 2003/0025793 A1 | * | 2/2003 | McMahon | 348/148 |
| 2003/0055942 A1 | * | 3/2003 | Senoo et al. | 709/223 |
| 2003/0095049 A1 | * | 5/2003 | Suzuki et al. | 340/870.13 |
| 2003/0109987 A1 | * | 6/2003 | Barman et al. | 701/213 |
| 2003/0144784 A1 | * | 7/2003 | Tashiro et al. | 701/54 |
| 2005/0143884 A1 | * | 6/2005 | Bihler et al. | 701/36 |
| 2009/0102626 A1 | * | 4/2009 | Lesesky | 340/431 |

FOREIGN PATENT DOCUMENTS

JP 2001-287605 A 10/2001

OTHER PUBLICATIONS

Hans-Christian von der Wense, "Introduction to LIN", Mar. 2000, 26 pages.

* cited by examiner

FRONT ELECTRONIC EQUIPMENT SYSTEM WITH A LIN-SUBBUS

TECHNICAL FIELD

The present invention relates to a front electronic equipment system for controlling front auxiliary equipments, such as a headlamp, a horn, a front washer and the like.

BACKGROUND ART

FIG. 11 is a circuit diagram showing a constitution example of a front electronic equipment system in a related art. A front ECU (Electronic Control Unit) 100 is connected with a power source line for supplying a power source from a battery, a main multiplexed line connected with a LAN (Local Area Network) for vehicle communicated by a protocol of CAN (Controller Area Network) or the like, various front auxiliary equipments, rear auxiliary equipments, sensors and switches.

The front ECU 100 is connected with head lamps 154RH, 154LH, side marker lamps 184RH, 184LH, clearance lamps 174aRH, 174aLH, front fog lamps 164RH, 164LH, cornering lamps 174bRH, 174bLH, horns 104aHI, 104bLO, and a front washer motor 194b as front auxiliary equipments by wire harnesses. Further, the front ECU100 is connected with a rear washer motor 254 as a rear auxiliary equipment. Further, the front ECU100 is connected with a horn switch 104e, a hood curtsy switch 104f, a washer level sensor 194a and a head lamp cleaner relay 104c by wire harnesses.

The front ECU100 is mounted with a CPU input interface for inputting signals inputted from switches and sensors to the CPU, an output interface for outputting signals to the head lamp cleaner relay 104c, and devices (semiconductor switches and mechanical relays) for driving lamps, motors and horns mounted to various auxiliary equipments, not illustrated at inside thereof.

As a related art of the invention, JP-A-2001-287605 discloses an optional LAN connecting wire harnesses capable of achieving common formation of main control apparatus constituting a basis even when modes of vehicles differ and capable of reducing cost. In this publication, a electronic equipment in a vehicle is controlled from sub ECU through gate wire harnesses.

According to the front electronic equipment system of the related art shown in FIG. 11, drive signals to various auxiliary equipments are transmitted from the front ECU to the auxiliary equipments respectively via wire harnesses. Signals from various sensors and switches are also inputted respectively by wire harnesses and therefore, a number of connector poles of the front ECU is increased and a number of pieces of the wire harnesses is also increased.

Therefore, when specifications/functions of front auxiliary equipments are changed, the wire harnesses connected to the front ECU need to change and kinds and numbers of the wire harnesses are also increased. Particularly, when functions of the front auxiliary equipments are increased, a number of circuits is increased and the wire harnesses become bulky to bring about an increase in mass thereof. At the same time, the front ECU also becomes bulky to bring about an increase in mass (deterioration of fuel/running function) and a deterioration in mountability and also softwares mounted to the front ECU become bulky. Thereby, a number of articles of the front ECUs is increased to thereby increase in a number of steps of development, addition to specifications/increase in numbers of steps of changing.

Further, the front ECU is mounted with a number of load drive devices (semiconductor switches or mechanical relays) and therefore, small-sized formation thereof is difficult and a problem of heat generation is also caused.

Further, when lamps, motors and the like in the auxiliary equipments are driven by PWM (Pulse Width Modulation) control, there also poses a problem of emitting noise from the wire harnesses to the lamps or motors. For example, an adverse influence is effected on an antenna cable of a radio or the like thereby.

In this respect, according to JP-A-2001-287605, the problems are improved by providing sub ECU. The invention discloses the technology of drastically resolving the problems by further developing JP-A-2001-287605.

DISCLOSURE OF THE INVENTION

That is, it is an object of the invention to provide a front electronic equipment system capable of dispersing functions of front ECU to standardize into individual functions and remarkably realizing simplified formation, wire saving formation, light-weighted formation of wire harnesses and simplified formation, small-sized formation, light-weighted formation of front ECU and low heat generating formation of front ECU.

Further, it is an another object of the invention to provide a front electronic equipment system capable of extremely easily dealing with changes in functions of front auxiliary equipments (differences of specifications of destination, grade and the like).

Further, it is an another object of the invention to provide a front electronic equipment system capable of significantly reducing noise emitted from wire harnesses from front ECU to front auxiliary equipments.

In order to achieve the above object, according to the present invention, there is provided a front electronic equipment system, comprising:

a load electrical parts, provided at a front portion of a vehicle;

a front electrical control unit, receiving a control signal for controlling the drive of the load electrical parts through a main bus line of the vehicle; and a drive control unit, connected to the front electrical control unit through a sub bus line, converting the control signal into a drive signal, and driving the load electrical parts based on the drive signal, wherein the front electrical control unit converts a communication protocol of the control signal from a communication protocol of the main bus line into a communication protocol of the sub bus line, and transmits the control signal received through the main bus line to the drive control unit through the sub bus line.

In the above configuration, by driving the load electrical parts by the drive control unit based on the control signal received from the front electrical control unit via the sub bus line, a function of a front ECU (electronic control unit) of a related art for carrying out an integrated control can be dispersed to standardize into individual functions. Therefore, with regard to increase/high function formation of the load electronic equipment related to the front, the drive control unit can absorb changes thereof and an influence on other drive control unit, front electrical control unit and wire harness can be minimized. Further, by shifting drive control unit included in a front ECU of a related art to outside of the front ECU, simplified formation, small-sized formation, light-weighted formation of the front ECU can be realized and also heat generation can be restrained. Further, by converting the protocol of the control signal and transmitting the converted control signal to the drive control unit by the front electrical control unit, a hierarchy type network by the main bus line and the sub bus line can be constructed. For example, by using a transmitting medium having a high specification for the main bus line and using a transmitting medium at low cost for the sub bus line, low cost formation can be constituted while ensuring necessary communication speed. Furthermore, for example, when the load electrical parts are driven by PWM, by driving the load electrical parts from the drive control unit, emittance of noise can be minimized.

Preferably, the front electronic equipment system further comprising an electronic connector connected to the load electrical parts. The drive control unit is provided in the electronic connector.

In the above configuration, by mounting the drive control unit to the electronic connectors, the load electrical parts can be driven from immediate vicinities.

Preferably, the load electrical parts is a plurality of the load electrical parts. The front electronic equipment system further comprising a first auxiliary equipment module on which a first load electrical parts of the plurality of load electrical parts is mounted. The electronic connector provided with the drive control unit for driving the first load electrical parts is coupled with the first auxiliary equipment module.

In the above configuration, by driving the plurality of load electrical parts into a module by single drive control unit mounted to the single electronic connector, the wire harness can further be constituted by simplified formation, line saving formation, light-weighted formation. Further, a number of connector terminals of the front ECU can also be reduced.

Preferably, the load electrical parts is a plurality of the load electrical parts. The front electronic equipment system further comprising a second auxiliary equipment module on which a second load electrical parts of the plurality of load electrical parts and a sensor are mounted. The electronic connector provided with the drive control unit for driving the second load electrical parts is coupled with the second auxiliary equipment module. The drive control unit for driving the second load electrical parts converts a sensor signal outputted from the sensor into the control signal. The drive control unit transmits the control signal to the front electrical control unit through the sub bus line.

In the above configuration, by driving and monitoring the load electrical parts and the sensor by single drive control unit mounted to the electronic connector coupled to the second auxiliary equipment module formed into a module, the wire harness can be constituted by simplified formation, line saving formation, light-weighted formation. Further, also the number of the connector terminals of the front ECU can be reduced.

Preferably, the load electrical parts is a plurality of the load electrical parts. The front electronic equipment system further comprising a first auxiliary equipment module on which a first load electrical parts of the plurality of load electrical parts is mounted. The drive control unit for driving the first load electrical parts is provided at the first auxiliary equipment module.

In the above configuration, by mounting single drive control unit to the first auxiliary equipment module forming the plurality of load electrical parts into a module and driving the plurality of load electrical parts, the wire harness can further be constituted by simplified formation, line saving formation, light-weighted formation. Further, also the number of the connector terminals of the front ECU can be reduced.

Preferably, the load electrical parts is a plurality of the load electrical parts. The front electronic equipment system further comprising a second auxiliary equipment module on which a second load electrical parts of the plurality of load electrical parts and a sensor are mounted. The drive control unit for driving the second load electrical parts is provided at the second auxiliary equipment module. The drive control unit for driving the second load electrical parts converts a sensor signal outputted from the sensor into the control signal. The drive control unit transmits the control signal to the front electrical control unit through the sub bus line.

In the above configuration, by mounting single drive control unit to the auxiliary equipment module forming the load electrical parts and the sensor into a module and driving and monitoring the load electrical parts and the sensor, the wire harness can further be constituted by simplified formation, line saving formation, light-weighted formation. Further, also the number of the connector terminals of the front ECU can be reduced.

Preferably, the first load electrical parts has at least one of a clearance lamp and a cornering lamp.

In the above configuration, by forming the clearance lamp and the cornering lamp into a module, the wire harness can be constituted by simplified formation, line saving formation, light-weighted formation. Further, also the number of the connector terminals of the front ECU can be reduced.

Preferably, the second load electrical parts has a front washer motor. The sensor mounted on the second auxiliary equipment module has a washer level sensor.

In the above configuration, by forming the front washer motor and the washer level sensor into a module, the wire harness can be constituted by simplified formation, line saving formation, light-weighted formation. Further, also the number of the connector terminals at the front ECU can be reduced.

Preferably, the front electrical control unit is connected to the drive control unit through a power source line. The control signal is transmitted between the front electrical control unit and the drive control unit by a superposed communication at the power source line served as the sub bus line.

In the above configuration, by communicating the control signal by the superposed communication at the power source line, connection to the front electrical control unit can be carried out by two pieces of wire harnesses of the power source line and a GND line, and the wire harness can be constituted by simplified formation, line saving formation, light-weighted formation. Further, also the number of the connector terminals of the front ECU can be reduced.

BRIEF DESCRIPTION OF THE DRAWINGS

The above objects and advantages of the present invention will become more apparent by describing in detail preferred exemplary embodiments thereof with reference to the accompanying drawings, wherein.

BEST MODE FOR CARRYING OUT THE INVENTION

A detailed explanation will be given of embodiments of the invention in reference to the attached drawings as follows.

Figure 3:
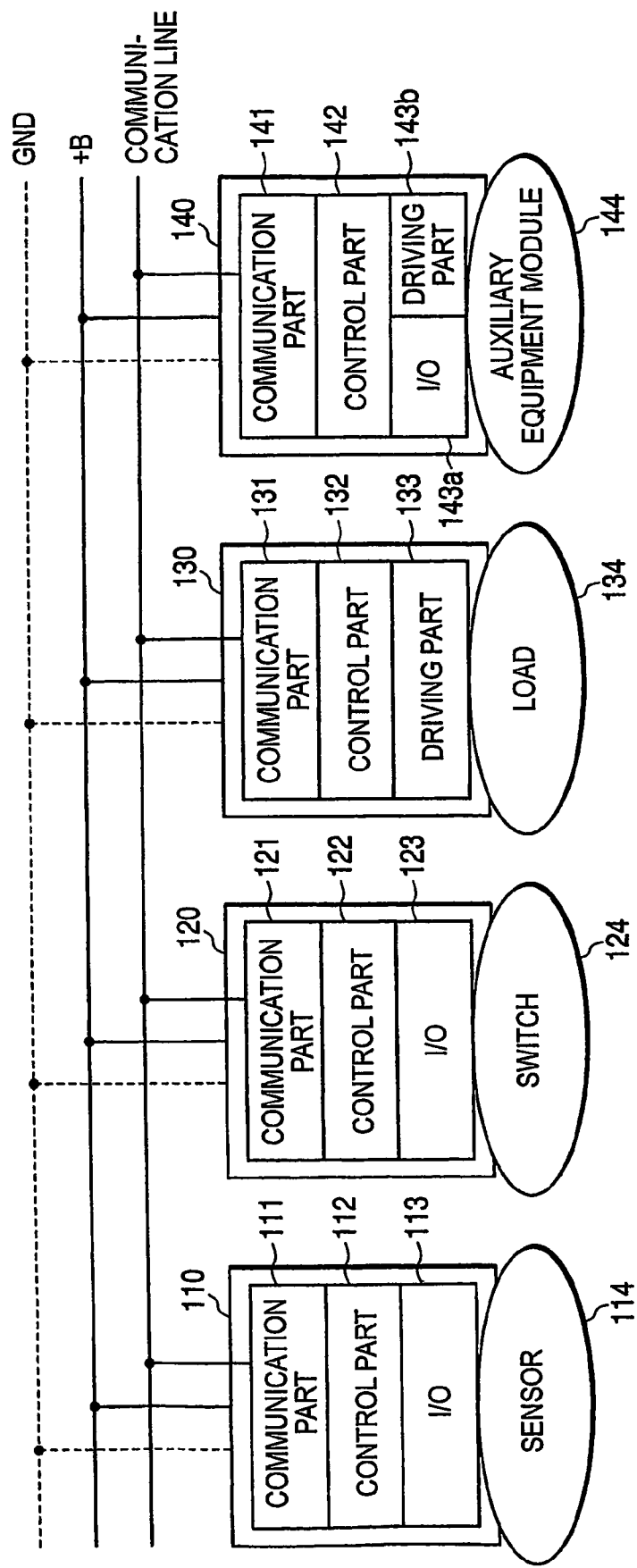
FIG. 3 is a functional block diagram of an electronic connector according to the embodiment of the invention.

FIG. 3 is a functional block diagram showing the basic concept of an electronic connector according to an embodiment of the invention. An electronic connector 110 directly connected to a connector of a sensor 114 is provided with a communication portion 111, a control portion 112 and an I/O portion 113 mounted on an electronic board included therein. Also an electronic connector 120 directly connected to a switch SW124 is provided with a communication portion 121, a control portion 122 and an I/O portion 123 mounted on an electronic board included therein. An electronic connector 130 directly connected to a load (lamp, motor or the like) 134 is provided with a communication portion 131, a control portion 132 and a drive portion 133 mounted on an electronic board included therein. An electronic connector 140 directly connected to an auxiliary equipment module 144 is provided with a communication portion 141, a control portion 142, an I/O portion 143a and a drive portion 143b mounted on an electronic board included therein.

The auxiliary equipment module 144 forms an auxiliary equipment realizing a function other than the basic function of a vehicle (for example front washer or the like) in a module and is constituted by a plurality of electrical parts. For example, an auxiliary equipment module realizing a front washer has at least a motor and a sensor. Further, the auxiliary equipment module 144 may form a plurality of auxiliary equipments of a cornering lamp and a clearance lamp in a module. The auxiliary equipment module has at least two lamps.

In this way, the auxiliary equipment module 144 is constituted by variously combining a plurality of electrical parts (motor, lamp, horn, heater, switch, sensor and the like). Among the electrical parts switches and sensors are connected to the I/O portion 143a of the electronic connector 140 and monitored by the control portion 142. Further, among the electrical parts, loads of motor, lamp and the like are connected to and driven by the drive portion 143b of the electronic connector 140. Here, the I/O portion 143a of the electronic connector 140 is not needed when sensors or switches are not present in the auxiliary equipment module 144.

The communication portions 111 through 141 of the respective electronic connectors communicate control signals with other systems through a communication line or a power source line. As communication protocol, LIN (Local Interconnect Network) or the like may be used. Further, the communication portions can also communicate with apparatus on CAN (Control Area Network) from LIN via gateway apparatus and apparatus on LIN frontward therefrom.

The control portion 112 receives a sensor signal of a sensor which monitors a state of the load 134 via the I/O portion 113. The control portion 112 attaches an address of other electronic connector, ECU, or apparatus of other system to the received sensor or ON/OFF signal, and output the signal to the communication portion 111 as a control signal.

When the switch SW124 is tuned ON/OFF by user, the control portion 122 receives the ON/OFF signal via the I/O portion 123. The control portion 122 attaches an address of other electronic connector, ECU, or apparatus of other system to the received sensor or ON/OFF signal, and output the signal to the communication portion 121 as a control signal.

The control portion 132 receives a control signal for driving the load 134 from other electronic connector, ECU or apparatus of other system via the communication portion 131. The control portion 132 controls the drive portion 133 to drive the load 134 based on the received control signal. The drive portion 133 drives the load 134 of a lamp, a motor, a horn or the like by a semiconductor element of MOSFET or the like. Further, the drive portion 133 can also carry out PWM control of the load 134 such as adjusting speed of a motor.

The control portion 142 receives a sensor signal or an ON/OFF signal via the I/O portion 143a when a sensor or a switch is provided in the auxiliary equipment module 144. The control portion 142 drives the load by instructing the drive portion 143b when the received sensor signal or ON/OFF signal is a signal for load in the same auxiliary equipment module 144. Further, when the received sensor signal or ON/OFF signal is a signal for load which is not present in the same auxiliary equipment module 144, the control portion 142 attaches an address of other electronic connector, ECU, or apparatus of other system to the received sensor or ON/OFF signal, and output the signal to the communication portion 141 as a control signal.

Further, when the load is present in the auxiliary equipment module 144, the control portion 142 receives a control signal for driving load from other electronic connector, ECU, or apparatus of other system via the communication portion 141. The control portion 142 controls the drive portion 143b for driving the load based on the received control signal.

The respective electronic connectors 110 through 140 are connected to a power source line (battery line+B) and a GND line. The electronic connectors 110 through 140 are directly connected to the sensor 114, the switch SW124, the load 134 and the auxiliary equipment module 144, and therefore joint of the power source and the ground is absorbed by the electronic boards of the electronic connectors 110 through 140 included therein. The communication portions 111 through 141 of the respective electronic connectors 110 through 140 are connected to a communication line. Here, the communication line is not needed when a power-supply superposition multiplex system is adopted in communication. In that case, the communication portions 11 through 141 are connected to the power source line.

Figure 4:
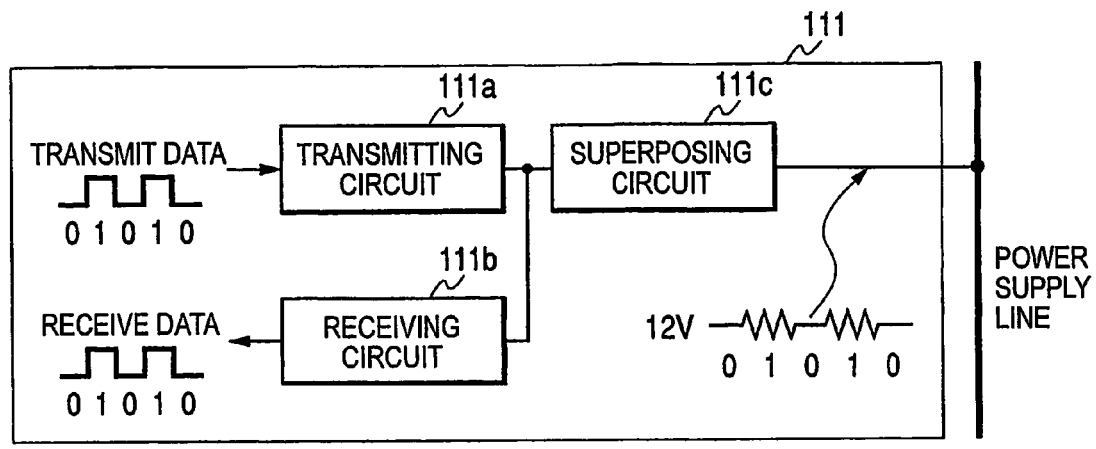
FIG. 4 is a block diagram showing an inner constitution of a communication portion when the power-supply superposition multiplex system is adopted.

Explaining here of the power-supply superposition multiplex system, the power-supply superposition multiplex system is a system of transmitting a signal without a dedicated communication line by superposing communication on the power source line. FIG. 4 is a block diagram showing an inner constitution of the communication portion 111 when the power-supply superposition multiplex system is adopted. The communication portion 111 includes a transmitting circuit 111a, a receiving circuit 111b and a superposing circuit 111c.

The transmitting circuit 111a modulates transmitting data in a pulse-like shape inputted from the control portion 112 by, for example, ASK (Amplitude Shift Keying) modulation to output to the superposing circuit 111c. The superposing circuit 111c superposes the modulated signal inputted from the transmitting circuit 111c to the power source line. Further, the superposing circuit 111c separates a communication signal superposed at the power source line to output to the receiving circuit 111c. The receiving circuit 111b demodulates the signal inputted from the superposing circuit 111c and outputs a digital signal in a pulse-like shape to the control portion 112 as receiving data.

Figure 5:
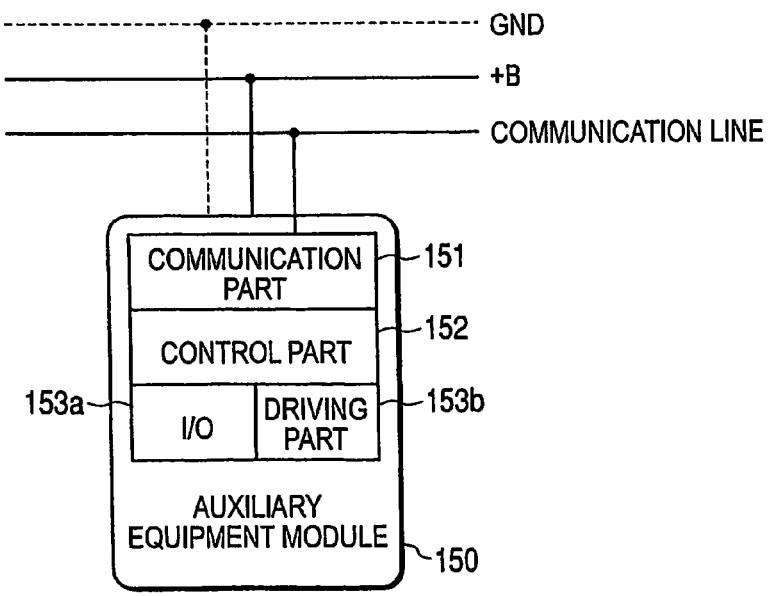
FIG. 5 is a functional block diagram showing a basic concept of an auxiliary equipment module according to the embodiment of the invention.

FIG. 5 is a functional block diagram showing the basic concept of the auxiliary equipment module according to the invention. An auxiliary equipment module 150 of the embodiment includes a communication portion 151, a control portion 152, an I/O portion 153a and a drive portion 153b mounted on an electronic board included therein. The auxiliary equipment module 150 is connected to the power source line (battery line+B) and the GND line. The communication portion 151 of the auxiliary equipment module 150 is connected to the communication line. Here, the communication line is not needed when the power-supply superposition multiplex system is adopted in communication.

Further, functions of the communication portion 151, the control portion 152, the I/O portion 153a and the drive portion 153b on the electronic board included in the auxiliary equipment module 150 are similar to the functions included in the electronic connector 140 and therefore, an explanation thereof will be omitted.

Figure 6:
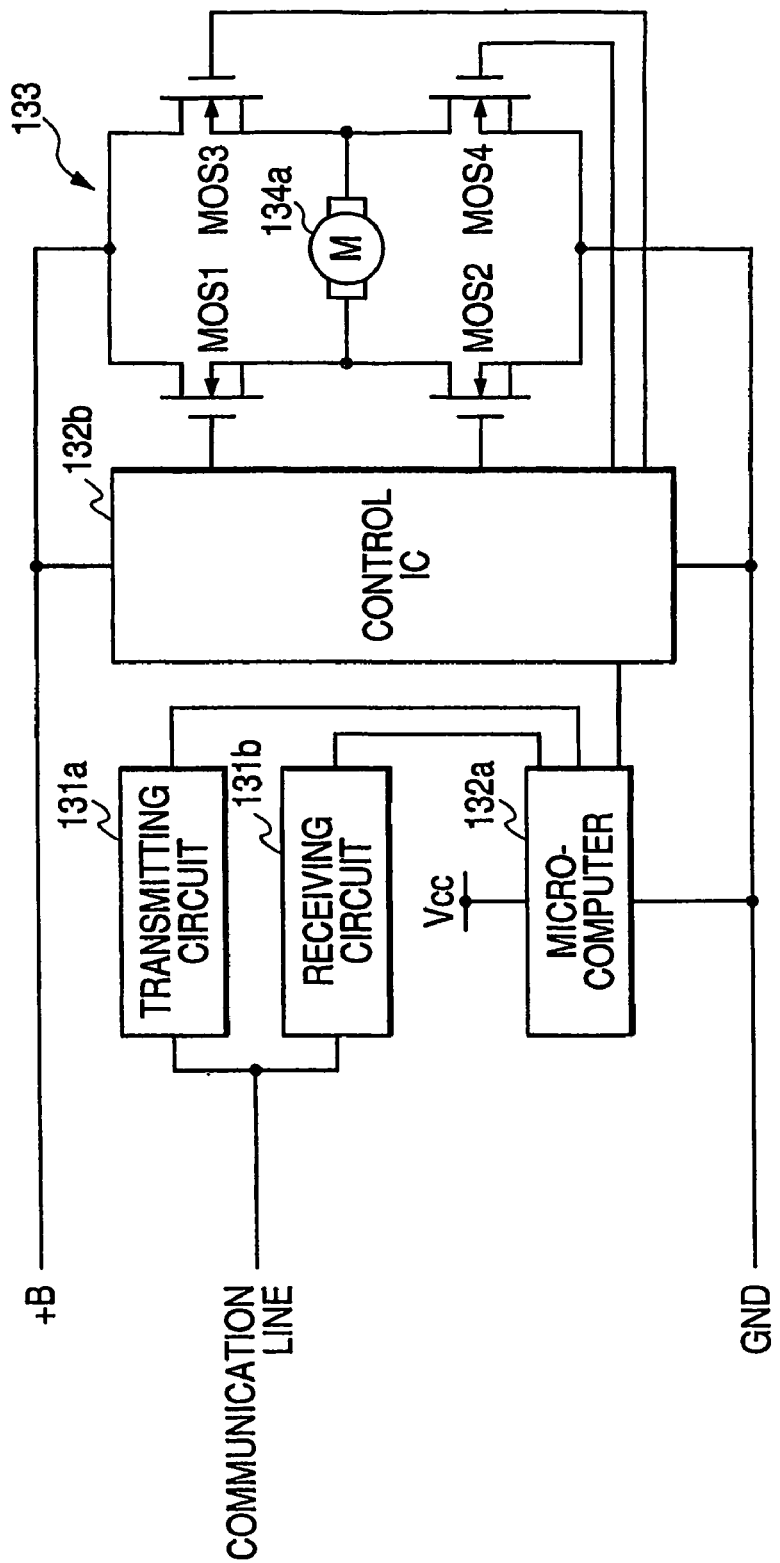
FIG. 6 is a diagram showing an example of a circuit constitution (communication line system) on an electronic board included in the electronic connector or the auxiliary equipment module according to the embodiment of the invention.

FIG. 6 is a diagram showing an example of a circuit constitution (communication line system) on an electronic board included in an electronic connector or an auxiliary equipment module according to the embodiment of the invention. An explanation will be given of an example of an electronic connector directly connected to a motor 134a when the load 134 is the motor 134a. The electronic connector shown in FIG. 6 includes a transmitting circuit 131a, a receiving circuit 131b, a microcomputer 132a, a control IC 132b and an H bridge circuit 133 constituted by MOS type field effect transistors (MOS 1 through 4).

The power source line supplies the battery power to the control IC132b and the H bridge circuit 133. The transmitting circuit 131a modulates a digital signal in a pulse-like shape inputted from the microcomputer 132a to transmit to the communication line. The receiving circuit 131b receives a control signal from the communication line to the receiving circuit 131b per se to modulate to output to the microcomputer 132a.

The control IC132b includes a nigh side MOS driver, not illustrated, for driving MOS1 and MOS3, a charge pump, not illustrated, for elevating voltage supplied to the high side MOS driver and a low side MOS driver, not illustrated, for driving MOS2 and MOS4 to control to rotate the motor 134a regularly and reversely. Here, the control IC 132b in the drawing may be integrated with the transmitting circuit 131a and the receiving circuit 131b to form an IC and may further be integrated with the microcomputer 132a to form an IC.

The microcomputer 132a decodes the control signal inputted from the receiving circuit 131b and outputs a control signal to the high side MOS driver and the low side MOS driver. Further, when it is necessary to transmit a control signal to other electronic connector or ECU, the microcomputer 132a outputs the control signal to the transmitting circuit 131a.

When MOS1 and MOS4 constituting the H bridge circuit 133 are turned ON and MOS2 and MOS3 are turned OFF, the motor 134a is regularly rotated. When MOS2 and MOS3 are turned ON and MOS1 and MOS4 are turned OFF, the motor 134a is rotated reversely. Therefore, the high side MOS driver makes MOS1 ON and MOS3 OFF when the motor 134 is rotated regularly. The high side MOS driver makes MOS1 OFF and MOS3 ON when the motor 134a is rotated reversely. The low side MOS driver makes MOS2 OFF and MOS4 ON when the motor 134a is rotated regularly. The low side. MOS drive makes MOS2 ON and MOS4 OFF when the motor 134a is rotated reversely.

When speed control of the motor 134a is needed, a PWM control circuit, not illustrated, is provided in the control IC132b. The PWM control circuit is provided at a prestage of the high side MOS drive and the low side MOS driver and outputs a PWM waveform having an arbitrary duty ratio to the high side MOS driver and the low side MOS driver.

Figure 7:
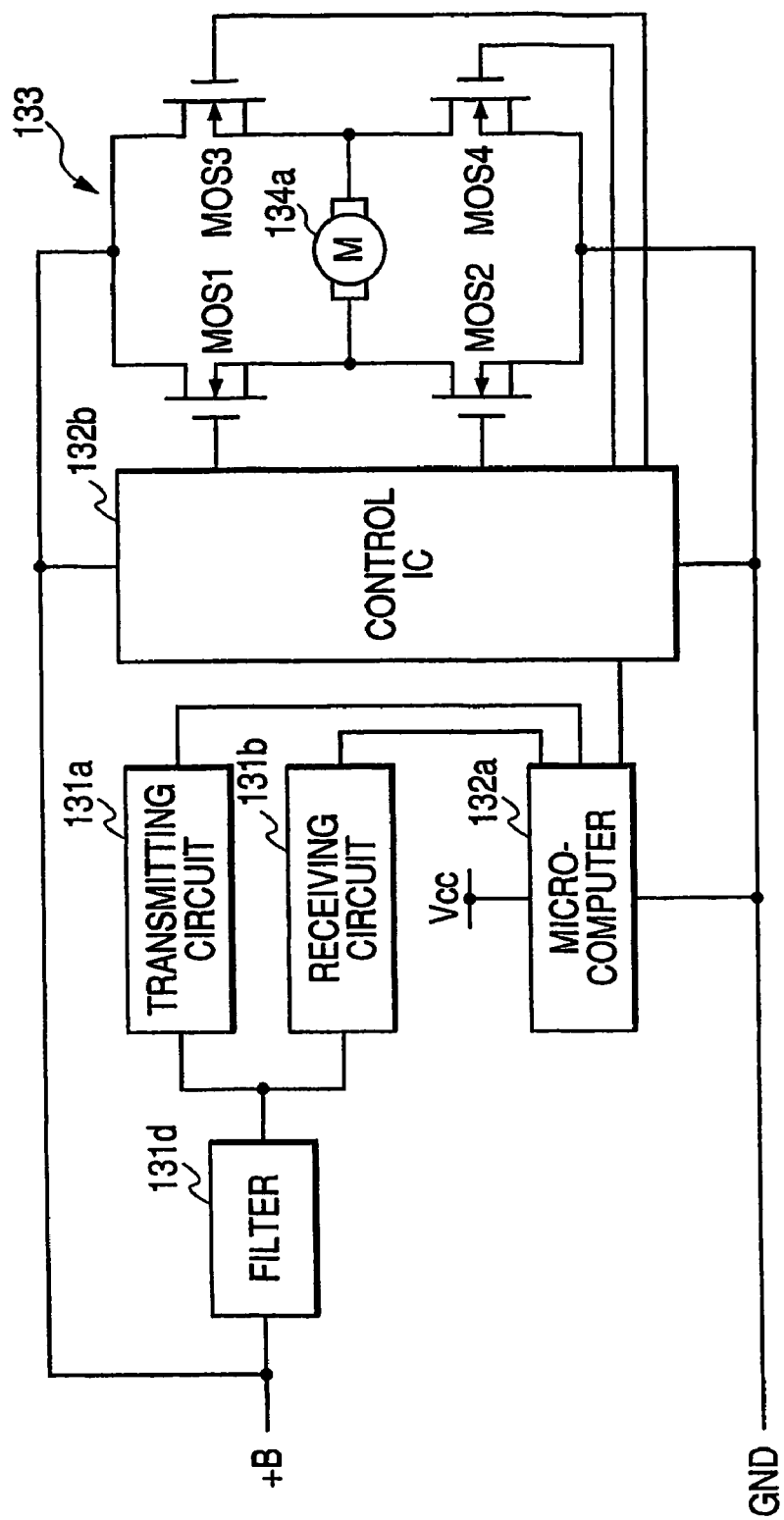
FIG. 7 is a diagram showing an example of a circuit constitution (power-supply superposition multiplex system) included in the electronic connector or the auxiliary equipment module according to the embodiment of the invention.

FIG. 7 is a diagram showing an example of a circuit constitution (power-supply superposition multiplex system) on an electronic board included in an electronic connector or an auxiliary equipment module according to the embodiment of the invention. An electronic connector shown in FIG. 7 includes the transmitting circuit 131a, the receiving circuit 131b, a filter 131d, the microcomputer 132a, the control IC 132b and the H bridge circuit 133 constituted by MOS type field effect transistors (MOS1 through 4).

The filter 131d is a band pass filter for filtering a band of carrying a control signal superposed at the power source line. The filter 131d outputs a signal of the filtered band to the receiving circuit 131b. The other elements are similar to those in the case of the communication line system and therefore, an explanation thereof will be omitted.

Figure 8:
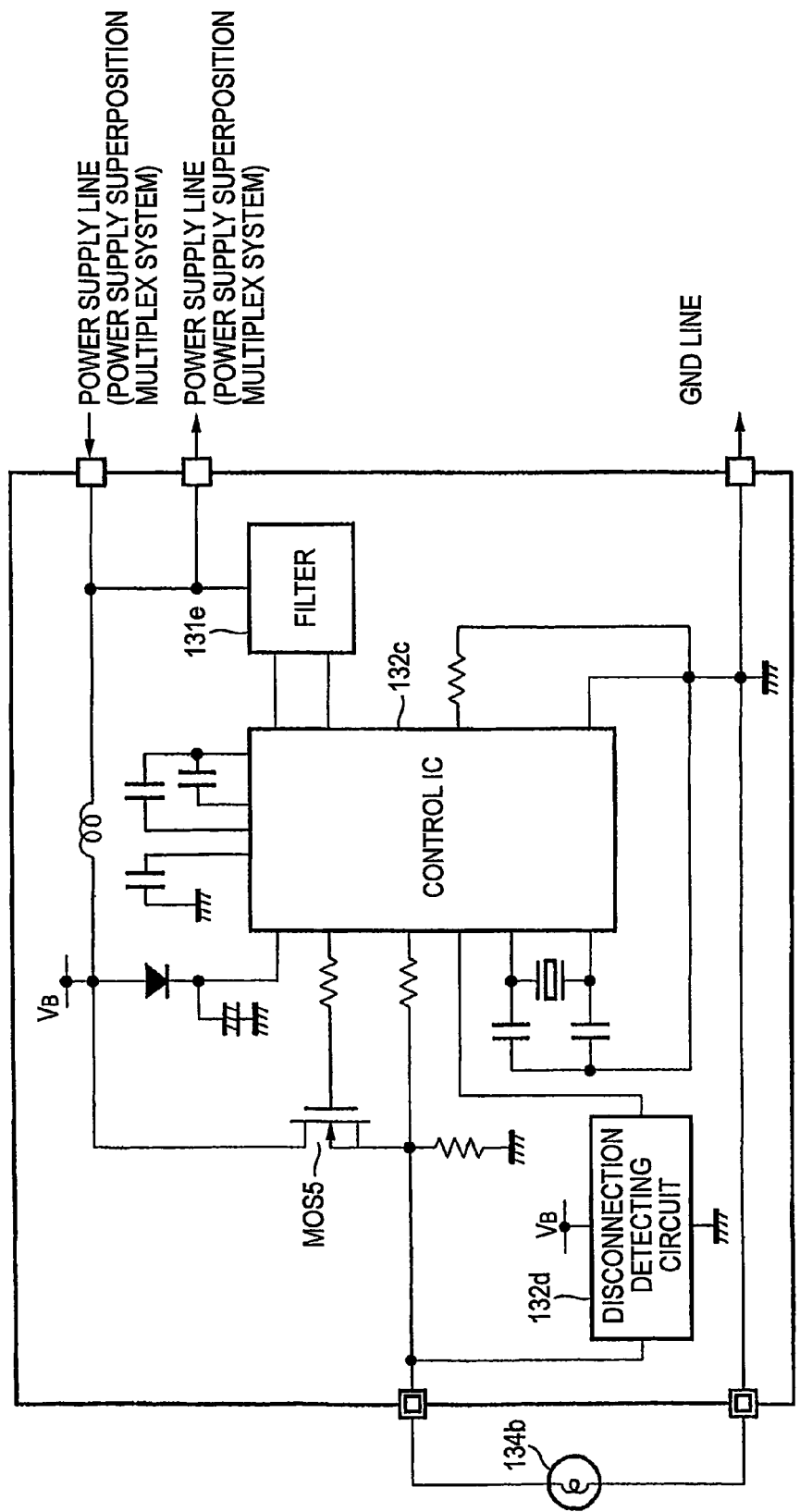
FIG. 8 is a diagram showing an example of a circuit constitution (power-supply superposition multiplex system) on an electronic board included in the electronic connector or the auxiliary equipment module according to the embodiment of the invention.

FIG. 8 is a diagram showing an example of a circuit constitution (power-supply superposition multiplex system) on an electronic board included in an electronic connector or an auxiliary equipment module according to the embodiment of the invention. An explanation will be given of an example of an electronic connector directly connected to a lamp 134b when the load 134 is the lamp 134b. The electronic connector shown in FIG. 8 includes a control IC132c, a filter 131e, an MOS type field effect transistor MOS5, and a disconnection detecting circuit 132d.

The power source line wired from the front ECU100 directly or via other electronic connector, supplies the battery power to the control IC 132c and the MOS type field effect transistor MOS5. Further, the power source line is connected also to the filter 131e via a coupling capacitor, not illustrated, and transmits a superposed control signal to the control IC132c. When it is necessary to supply power or transmit a control signal to other electronic connector, the power source line is wired to the electronic connector. The GND line connects the ground level of the lamp 134b and the control IC132c to the ground directly or via other electronic connector.

The control IC132c is provided with a regulator (constant voltage power source circuit), a charge pump, an MOSFET driver, a microcomputer, a PWM control circuit, a power-supply superposed multiplex transmitting circuit and a power-supply superposed multiplex receiving circuit. The regulator generates a logic power source (for example 5V) based on the battery power source (for example, 12V) supplied from the power source line. The charge pump elevates the battery power source (for example, 12V) supplied from the power source line to, for example, 12V+10V. The MOSFET driver drives the MOS type field effect transistor MOS5 by voltage elevated by the charge pump.

The microcomputer is operated by the logic power source generated by the regulator and a transmitting frequency of a transmitting circuit (not illustrated), decodes a control signal received by the power-supply superposed multiplex receiving circuit and designates a predetermined duty ratio to the PWM control circuit. The PWM control circuit generates a gate driving signal of the designates duty ratio. The MOSFET driver controls to ON/OFF of a gate electrode of the MOS type field effect transistor MOS5. Further, the PWM control circuit may not be provided when light of the lamp 134b is not controlled or the like.

The power-supply superposed multiplex transmitting circuit modulates the control signal generated by the microcomputer to superpose at the power source line to transmit. For example, when disconnection or the like is brought about, a warning signal is transmitted to the main multiplexing line via the front ECU100. The power-supply superposed multiplex receiving circuit receives a control signal from the power source line to the circuit per se to modulate to output to the microcomputer.

The filter 131e is a band pass filter for filtering a band carrying the control signal superposed at the power source line. The filter 131e outputs the filtered signal of the band to the power-supply superposed multiplex receiving circuit.

The gate electrode of the MOS type field effect transistor MOS5 is driven to ON/OFF by an MOSFET driver, not illustrated, in the control IC132c. When the gate electrode is turned ON, the battery power from the power source line is supplied to the lamp 134b and when the gate electrode is turned OFF, supply of the battery power to the lamp 134b is cut. Further, the MOS type field effect transistor MOS5 may be provided with a protection circuit.

The disconnection detecting circuit 132d monitors voltage of an electric wire supplying electricity to the lamp 134b to compare with a predetermined threshold voltage to detect whether disconnection is brought about in the electric wire. A result of detection is outputted to a microcomputer, not illustrated, in the control IC132c.

Further, although an explanation has been given of the power-supply superposition multiplex system as an example of the electronic connector directly connected to the lamp 134b, a communication line system may be used similar to the explanation of the example of the electronic connector directly connected to the motor 134a.

Figure 9:
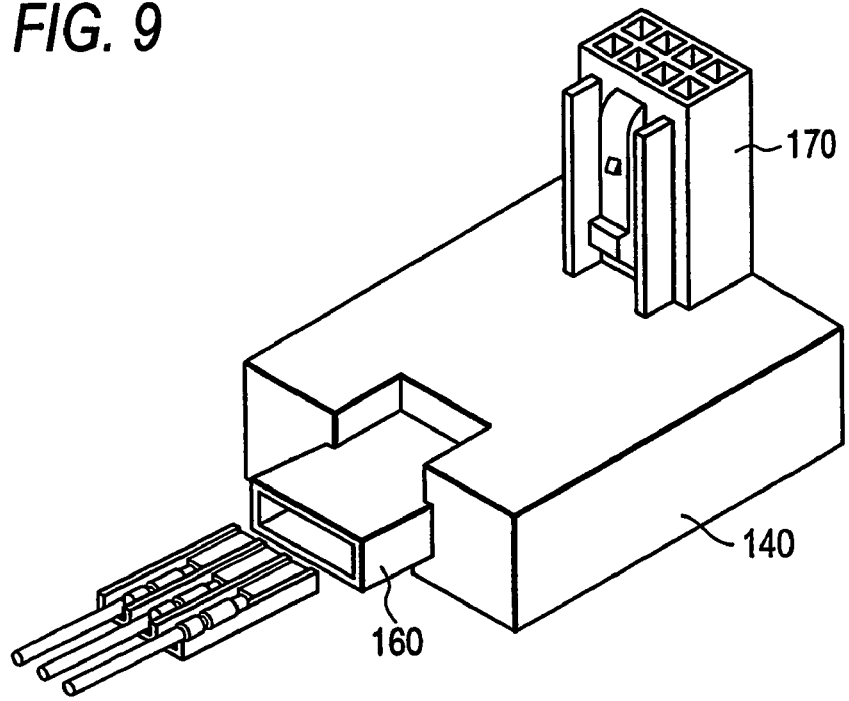
FIG. 9 is a perspective view showing an outlook of the electronic connector (communication line system) according to the embodiment of the invention.

FIG. 9 is a perspective view showing an outlook of an electronic connector (communication line system) according to the embodiment of the invention. The electronic connector is an example of the electronic connector 140 connected to the auxiliary equipment module 144. The electronic connector 140 includes a socket 160. The socket 160 is inserted with three pieces of wire harnesses of the power source line, the GND line and the communication line. Connection of the electronic connector 140 and the auxiliary equipment module 144 is carried out by fitting to couple a socket 170 of the electronic connector 140 and pins of the auxiliary equipment module 144. A shape of the electronic connector 140 shown in FIG. 9 is an example and there are various shapes in accordance with the auxiliary equipment module 144. The electronic board mounted with IC (ASIC or the like) and the semiconductor switching element is included at inside of the electronic connector 140.

Figure 10:
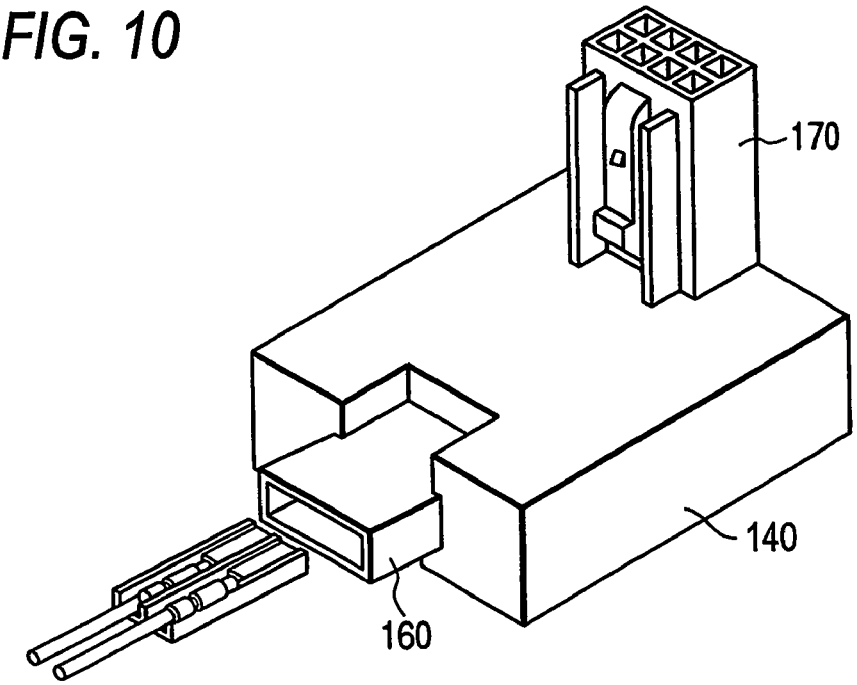
FIG. 10 is a perspective view showing an outlook of the electronic connector (power-supply superposition multiplex system) according to the embodiment of the invention.
Figure 11:
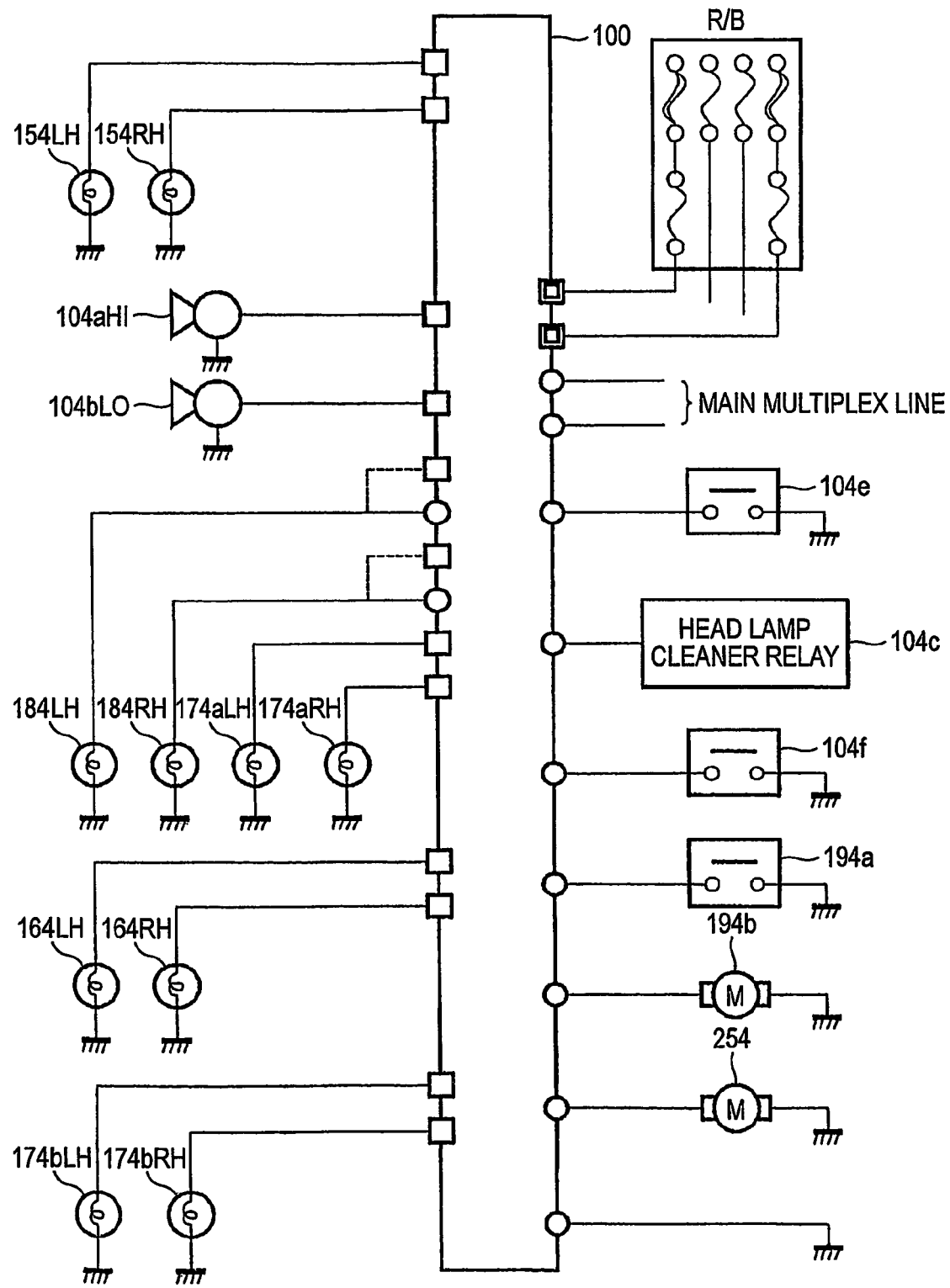
FIG. 11 is a circuit diagram showing a constitution example of a front electronic equipment system according to the related.

FIG. 10 is a perspective view showing an outlook of an electronic connector (power-supply superposition multiplex system) according to the embodiment of the invention. The electronic connector 140 includes the socket 160. The socket 160 is inserted with two pieces of wire harnesses of the power source line and the GND line. The other elements are similar to those in the case of the communication line system and therefore, an explanation thereof will be omitted. Whereas about ten pieces of wire harnesses are needed in the related art since wiring is carried out from ECU to individual electrical parts at inside of the auxiliary equipment module 144, a number of wire harnesses can be reduced to two pieces or three pieces by using the electronic connector according to the invention.

Figure 1:
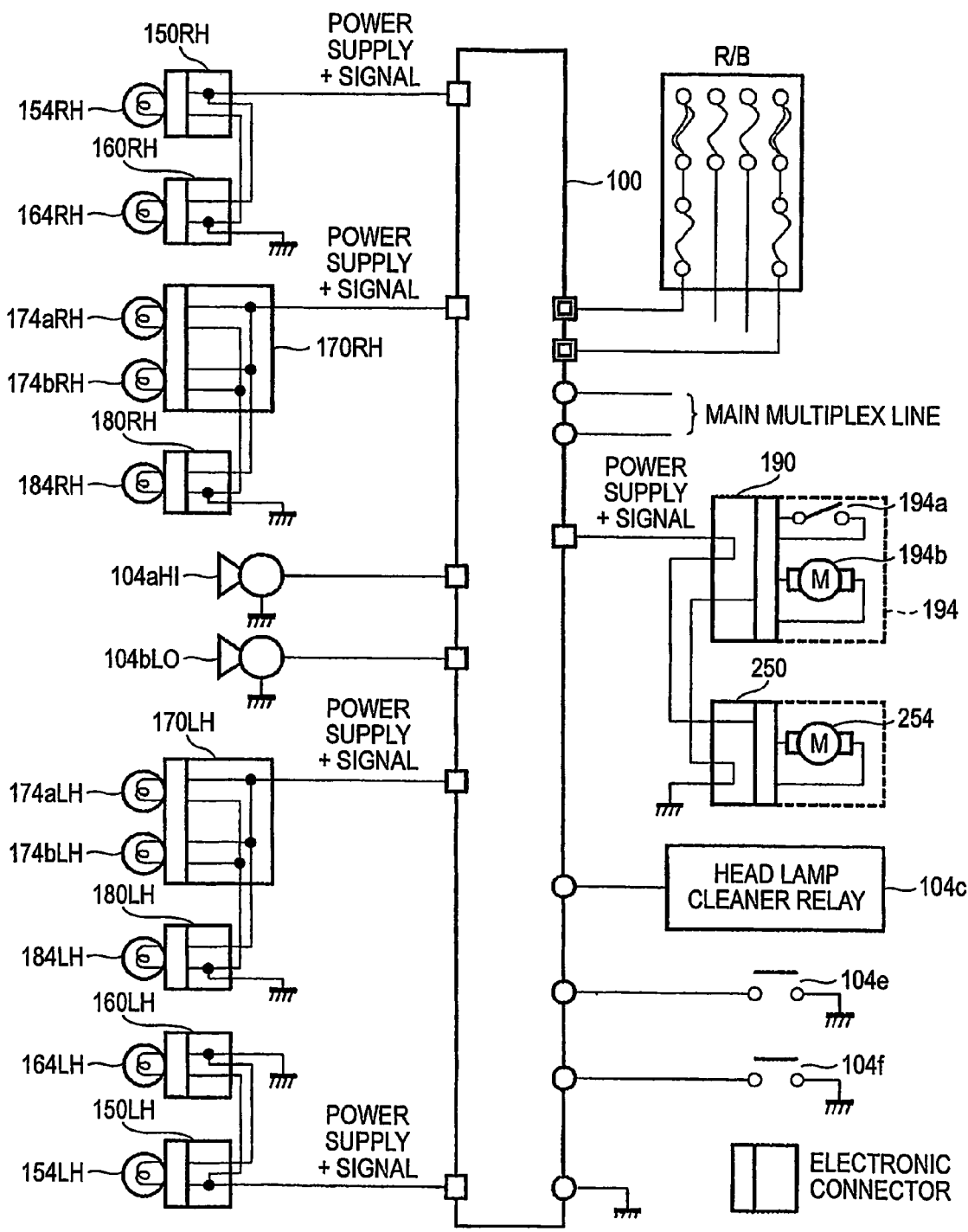
FIG. 1 is a circuit diagram showing a constitution example of a front electronic equipment system (power-supply superposition multiplex system) according to an embodiment of the invention.

FIG. 1 is a circuit diagram showing a constitution example of a front electronic equipment system (power-supply superposition multiplex system) according to the embodiment of the invention. The front electronic equipment system has a front ECU100. The front ECU100 is connected with the power source line for supplying power from the battery, the main multiplexing line constructing intra-vehicular LAN communicated by a protocol of CAN or the like, various auxiliary equipments, and sensors/switches for controlling the various auxiliary equipments.

The front ECU100 is connected with the head lamps 154RH, 154LH, the front fog lamps 164RH, 164LH, the clearance lamps 174aRH, 174aLH, the cornering lamps 174bRH, 174bLH, the side marker lamps 184RH, 184LH, the horns 104aHI, 104bLO, and the front washer module 194. The front washer module 194 is provided with the washer level sensor 194a, a front washer motor 194b.

The clearance lamp 174aRH and the cornering lamp 174bRH are formed into an auxiliary equipment module. The same goes with the left side. Further, the front ECU100 is connected with the rear washer 254 as the rear auxiliary equipment. Further, the front ECU100 is connected with the head lamp cleaner relay 104c, the horn switch 104e and the hood curtsy switch 104f. Here, portions or totals of the front fog lamps 164RH, 164LH, the side marker lamps 184RH, 184LH, and the rear washer 254 may not be provided according to destinations or grades.

The power source line for supplying power from the battery or an alternator, not illustrated, and the power source line transmitting superposed multiplexing signals is divided by the front ECU100. One of the divided power source lines is connected to the head lamps 154RH, 154LH via electronic connectors 150RH, 150LH for the head lamps. Further, when the front fog lamps 164RH, 164LH are provided, the divided power source lines are connected to the front fog lamps 164RH, 164LH via the electronic connectors 150RH, 150LH, and electronic connectors 160RH, 160LH for the front fog lamps.

One of the power source lines divided by the front ECU100 is connected to the cornering lamps 174bRH, 174bLH via electronic connectors 170RH, 170LH for auxiliary equipment modules 174RH, 174LH and the clearance lamps 174aRH, 174aLH at insides of the auxiliary equipment modules 174RH, 174LH. Further, when the side marker lamps 184RH, 184LH are provided, the divided power source lines are connected to the side marker lamps 184RH, 184LH via the electronic connectors 170RH, 170LH for the auxiliary equipment modules 174RH, 174LH and electronic connectors 180RH, 180LH for the side marker lamps.

One of the power source lines divided by the front ECU100 is connected to the front washer motor 194b at inside of the front washer module 194 via an electronic connector 190 for the front washer module 194. The electronic connector 190 for the front washer module 194 transmits a washer level sensor signal from the front ECU100 to the main multiplexing line via the power source line. Further, when the rear washer 254 is provided, the power source line is connected to the rear washer 254 via the electronic connector 190 for the front washer module 194 and an electronic connector 250 for the rear washer.

Figure 2:
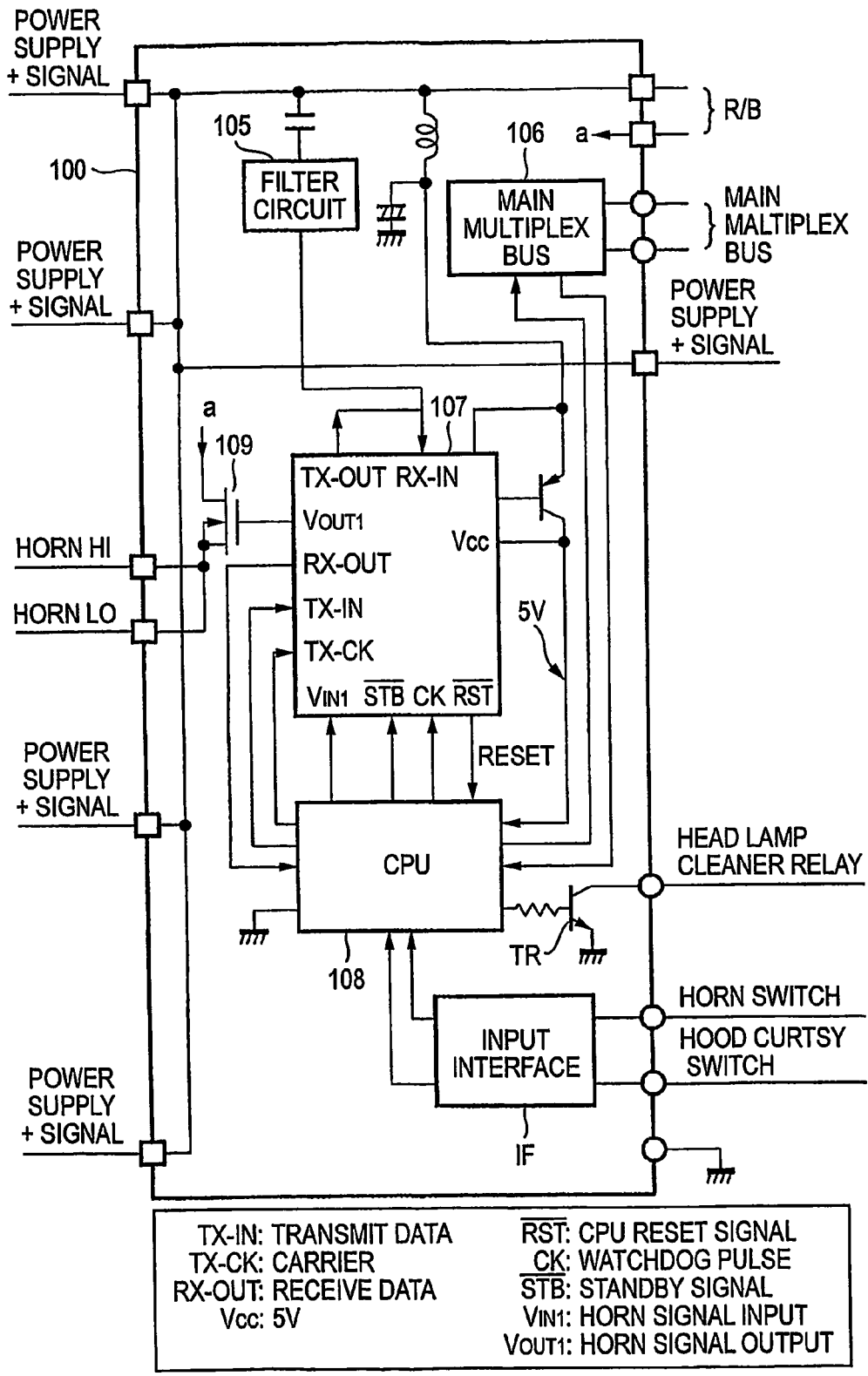
FIG. 2 is a block diagram showing an inner constitution of a front ECU100 (power-supply superposition multiplex system) of the front electronic equipment system according to the embodiment of the invention.

FIG. 2 is a block diagram showing an inner constitution of the front ECU100 (power-supply superposition multiplex system) of the front electronic equipment system according to the embodiment of the invention. The front ECU100 includes a filter circuit 105 for power source superposed multiplexing, a main multiplexing transmitting and receiving circuit (transceiver) 106, a control IC107, CPU108, a semiconductor relay 109, a transistor TR, and an input interface IF at inside thereof.

The filter circuit 105 for power source superposed multiplexing is a band pass filter for filtering a carrier wave frequency band of a control signal from the power source line superposed with the control signal via a coupling capacitor for cutting a direct current component. The main multiplexing transmitting and receiving circuit 106 receives the control signal from the main multiplexing line to output to CPU108. Further, the main multiplexing transmitting and receiving circuit 106 transmits a control signal outputted from CPU108 to the main multiplexing line.

The control IC107 includes a regulator (constant voltage power source circuit), a charge pump, a semiconductor relay driving driver, a watch dog timer circuit, a power-supply superposed multiplex transmitting circuit, and a power-supply superposed multiplex receiving circuit, not illustrated.

The regulator generates a logic power source (for example, 5V) based on the battery power source (for example, 12V) supplied from the power source line, and the charge pump elevates the battery power source (for example, 12V) supplied from the power source line to, for example, 12V+10V. The semiconductor relay driving driver drives the semiconductor relay 109 by voltage elevated by the charge pump.

The watch dog timer circuit is loaded with an initial value CK (for example, 30 seconds) from CPU108 at each constant time interval and starts counting down. When loading of the initial value CK from CPU108 is stopped and counting down is carried out down to 0, the watch dog timer circuit outputs an interrupting signal or a reset signal RST to CPU108.

The power-supply superposed multiplex transmitting circuit modulates a control signal (transmitting data TX-IN) inputted from CPU108 to a carrier wave (TX-CK) and outputs a control signal after modulation (transmitting data TX-OUT) to the filter circuit 105 for power source superposed multiplexing. The power-supply superposed multiplex receiving circuit demodulates a control signal (receiving data RX-IN) inputted from the filter circuit 105 for power source superposed multiplexing and outputs a control signal after demodulation (receiving data RX-OUT) to CPU 108.

CPU108 is operated by the logic power source generated by the regulator at inside of the control IC107 and a transmitting frequency of a transmitting circuit, not illustrated. CPU108 decodes the control signal inputted from the main multiplexing transmitting and receiving circuit 106, the control signal inputted from the power-supply superposed multiplex receiving circuit at inside of the control IC107 and a horn switch signal and a hood curtsy switch signal inputted from the input interface IF. Further, CPU108 specifies destinations of the signals.

CPU108 outputs the control signal to the main multiplexing transmitting and receiving circuit 106 when the specified destination is other than the front ECU100 or an auxiliary equipment belonging thereto. At this occasion, when the control signal inputted from the power-supply superposed multiplex receiving circuit is outputted to the main multiplexing transmitting and receiving circuit 106, CPU108 converts a communication protocol from a low speed protocol (for example, LIN) to a high speed protocol (for example, CAN).

CPU108 outputs the control signal to the power-supply superposed multiplex transmitting circuit at inside of the control IC107 when the specified destination is the electronic connectors 150 through 190, 250. At this occasion, when the control signal received from the main multiplexing transmitting and receiving circuit 106 is outputted to the power-supply superposed multiplex transmitting circuit, CPU108 converts the communication protocol from the protocol for high speed communication (for example, CAN) to the protocol for middle and low speed communication (for example, LIN).

CPU108 supplies a drive signal (high level signal/low level signal) to the base of the transistor TR when a switch signal (ON/OFF signal) of the head lamp cleaner relay 104*c* is received from the main multiplexing transmitting and receiving circuit 106. Further, CPU108 outputs the horn switch signal to the semiconductor relay driving driver at inside of the control IC107 when the horn switch signal is received from the interface IF. Further, CPU108 outputs a standby signal to the control CI107 when CPU108 determines to shift to a standby mode.

The semiconductor relay 109 is a power switching device of MOSFET or the like for switching to supply the power to the horns 104*a*HI, 104*b*LO. An electrode for trigger is controlled to ON/OFF by the semiconductor relay driving driver at inside of the control IC 107. The transistor TR controls a conduct electricity to the head lamp cleaner relay 104*c* and when a high level signal is applied from CPU108 to a gate thereof, electricity can be conducted to the head lamp cleaner relay 104*c*. The input interface IF outputs the horn switch signal and the hood curtsy switch signal from the horn switch 104*e* and the hood curtsy switch 104*f* to CPU108.

Further, the above-described embodiment shows an example of a preferred embodiments of the invention and the invention is not limited thereto but can variously be modified to embody within the range not deviated from gist thereof.

For example, in the above-described explanation of the front electronic equipment system, the power-supply superposition multiplex system is adopted. With regard to the point, the control signal can be communicated by using a dedicated communication line without being superposed on the power source line.

Further, instead of connecting the electronic connector 190 for the front washer module to the front washer module 194, an electronic board included in the electronic connector 190 may be mounted to the front washer module 194. Further, instead of connecting the electronic connector 170 for the clearance/cornering lamp module to the clearance/cornering modules 174RH, 174LH, an electronic board included in the electronic connector 170 may be mounted to the clearance/cornering lamp module 174RH, 174LH.

INDUSTRIAL APPLICABILITY

As is apparent from the above-described explanation, by driving the load system electrical part by the drive control unit based on the control signal received from the front electrical control unit via the sub bus line, the function of the front ECU (electronic control unit) of the related art for carrying out the integrated control can be dispersed to standardize into individual functions. Therefore, with regard to increase/high functional formation of the load electrical parts related to the front, changes thereof can be absorbed by the drive control unit, and an influence on other drive control unit, front electrical control unit and wire harness can be minimized. Further, by shifting the drive control unit included in the front ECU of the related art to outside of the front ECU, simplified formation, small-sized formation, light-weighted formation of the front ECU can be realized and also heat generation can be restrained. Further, by converting the protocol of the control signal and transmitting the converted control signal to the drive control unit by the front electrical control unit, the hierarchy network by the main bus line and the sub bus line can be constructed. For example, by using a transmission medium having a high specification for the main bus line and using a transmission medium at low cost for the sub buss line, low cost formation can be achieved while ensuring necessary communication speed. Furthermore, for example, when the load system electrical part is driven by PWM, by driving the load system electrical part by the drive control unit, emittance of noise can be minimized.

Further, by mounting the drive controller at the electronic connector, the load system electrical parts can be driven from immediate vicinities Further, by driving the plurality of load system electrical parts formed into a module by single drive control unit mounted with the single electronic connector, the wire harness can further be constituted by simplified formation, line saving formation, light-weighted formation. Further, also the number of the connector terminals of the front ECU can be reduced.

Further, by driving and monitoring the load system electrical part and the sensor by single drive control unit mounted to the second auxiliary equipment module formed into a module, the wire harness can be constituted by simplified formation, line saving formation, light-weighted formation. Further, also the number of the connector terminals of the front ECU can be reduced.

Further, by driving the plurality of load system electrical parts by mounting single drive control unit to the first auxiliary equipment module forming the plurality of load system electrical parts into a module, the wire harness can further be constituted by simplified formation, line saving formation and light-weighted formation. Further, also the number of the connector terminals of the front ECU can be reduced.

Further, by driving and monitoring the load system electrical part and the sensor by mounting single drive control unit to the second auxiliary equipment module forming the load system electrical part and the sensor into a module, the wire harness can further be constituted by simplified formation, line saving formation, light-weighted formation. Further, also the number of the connector terminals of the front ECU can be reduced.

Further by forming the clearance lamp and the cornering lamp into a module, the wire harness can be constituted by simplified formation, line saving formation, light-weighted formation. Further, also the number of the connector terminal of the front ECU can be reduced.

Further, by forming the front washer motor and the washer level sensor into a module, the wire harness can be constituted by simplified formation, line saving formation, light-weighted formation. Further, also the number of the connected terminals of the front ECU can be reduced.

Further, by communicating the control signal by the superposed communication at the power source line, connection of the front electrical control unit can be carried out by two pieces of wire harnesses of the power source line and a GND line, and the wire harness can be constituted by simplified formation, line saving formation, light-weighted formation. Further, also the number of the connector terminals of the front ECU can be reduced.

The invention claimed is:

1. A front electronic equipment system, comprising:
different kinds of load electrical parts, provided at a front portion of a vehicle;
electronic connectors, each electronic connector being fitted by direct connection to one kind of the load electrical parts;
a front electrical control unit, receiving a control signal for controlling the drive of the load electrical parts through a main bus line of the vehicle; and
a drive control unit, provided in the electronic connector, connected to the front electrical control unit through a sub bus line and wire harness, converting the control signal into a drive signal, and driving the load electrical parts based on the drive signal,
wherein the front electrical control unit is configured to convert a communication protocol of the control signal from a high speed communication protocol of the main bus line on the vehicle into a low speed communication protocol of the sub bus line on the vehicle, and transmits the control signal received through the main bus line to the drive control unit through the sub bus line;
wherein the one kind of the load electrical parts is mounted to the electronic connectors, and
wherein the direct connection comprises coupling a socket of the electronic connector with pins of the at least one of the load electrical part.

2. The front electronic equipment system as set forth in claim 1, wherein the load electrical parts is a plurality of the load electrical parts;
the front electronic equipment system further comprising a first auxiliary equipment module on which a first load electrical parts of the plurality of load electrical parts is mounted; and
wherein the electronic connector provided with the drive control unit for driving the first load electrical parts is coupled with the first auxiliary equipment module.

3. A front electronic equipment system, comprising:
different kinds of load electrical parts, provided at a front portion of a vehicle;
electronic connectors, each electronic connector being fitted by direct connection to one kind of the load electrical parts;
a front electrical control unit, receiving a control signal for controlling the drive of the load electrical parts through a main bus line of the vehicle; and
a drive control unit, provided in the electronic connector, connected to the front electrical control unit through a sub bus line and wire harness, converting the control signal into a drive signal, and driving the load electrical parts based on the drive signal,
a second auxiliary equipment module on which a second load electrical parts of the plurality of load electrical parts and a sensor are mounted,
wherein the front electrical control unit is configured to convert a communication protocol of the control signal from a high speed communication protocol of the main bus line on the vehicle into a low speed communication protocol of the sub bus line on the vehicle, and transmits the control signal received through the main bus line to the drive control unit through the sub bus line;
wherein the one kind of the load electrical parts is mounted to the electronic connectors;

wherein the load electrical parts is a plurality of the load electrical parts;
- wherein the electronic connector provided with the drive control unit for driving the second load electrical parts is coupled with the second auxiliary equipment module;
- wherein the drive control unit for driving the second load electrical parts converts a sensor signal outputted from the sensor into the control signal; and
- wherein the drive control unit transmits the control signal to the front electrical control unit through the sub bus line.

4. The front electronic equipment system as set forth in claim 1, wherein the load electrical parts is a plurality of the load electrical parts;
- the front electronic equipment system further comprising a first auxiliary equipment module on which a first load electrical parts of the plurality of load electrical parts is mounted; and
- wherein the drive control unit for driving the first load electrical parts is provided at the first auxiliary equipment module.

5. The front electronic equipment system as set forth in claim 1, wherein the load electrical parts is a plurality of the load electrical parts;
- the front electronic equipment system further comprising a second auxiliary equipment module on which a second load electrical parts of the plurality of load electrical parts and a sensor are mounted;
- wherein the drive control unit for driving the second load electrical parts is provided at the second auxiliary equipment module;
- wherein the drive control unit for driving the second load electrical parts converts a sensor signal outputted from the sensor into the control signal; and
- wherein the drive control unit transmits the control signal to the front electrical control unit through the sub bus line.

6. The front electronic equipment system as set forth in claim 2, wherein the first load electrical parts has at least one of a clearance lamp and a cornering lamp.

7. The front electronic equipment system as set forth in claim 4, wherein the first load electrical parts has at least one of a clearance lamp and a cornering lamp.

8. The front electronic equipment system as set forth in claim 3, wherein the second load electrical parts has a front washer motor; and
- wherein the sensor mounted on the second auxiliary equipment module has a washer level sensor.

9. The front electronic equipment system as set forth in claim 5, wherein the second load electrical parts has a front washer motor; and
- wherein the sensor mounted on the second auxiliary equipment module has a washer level sensor.

10. The front electronic equipment system as set forth in claim 1, wherein the front electrical control unit is connected to the drive control unit through a power source line; and
- wherein the control signal is transmitted between the front electrical control unit and the drive control unit by a superposed communication at the power source line served as the sub bus line.

11. The front electronic equipment system as set forth in claim 1, wherein the high speed communication protocol of the main bus line is controller areas network (CAN), and the low speed communication protocol of the sub bus line is Local Interconnect Network (LIN).

\* \* \* \* \*